Figure 1:
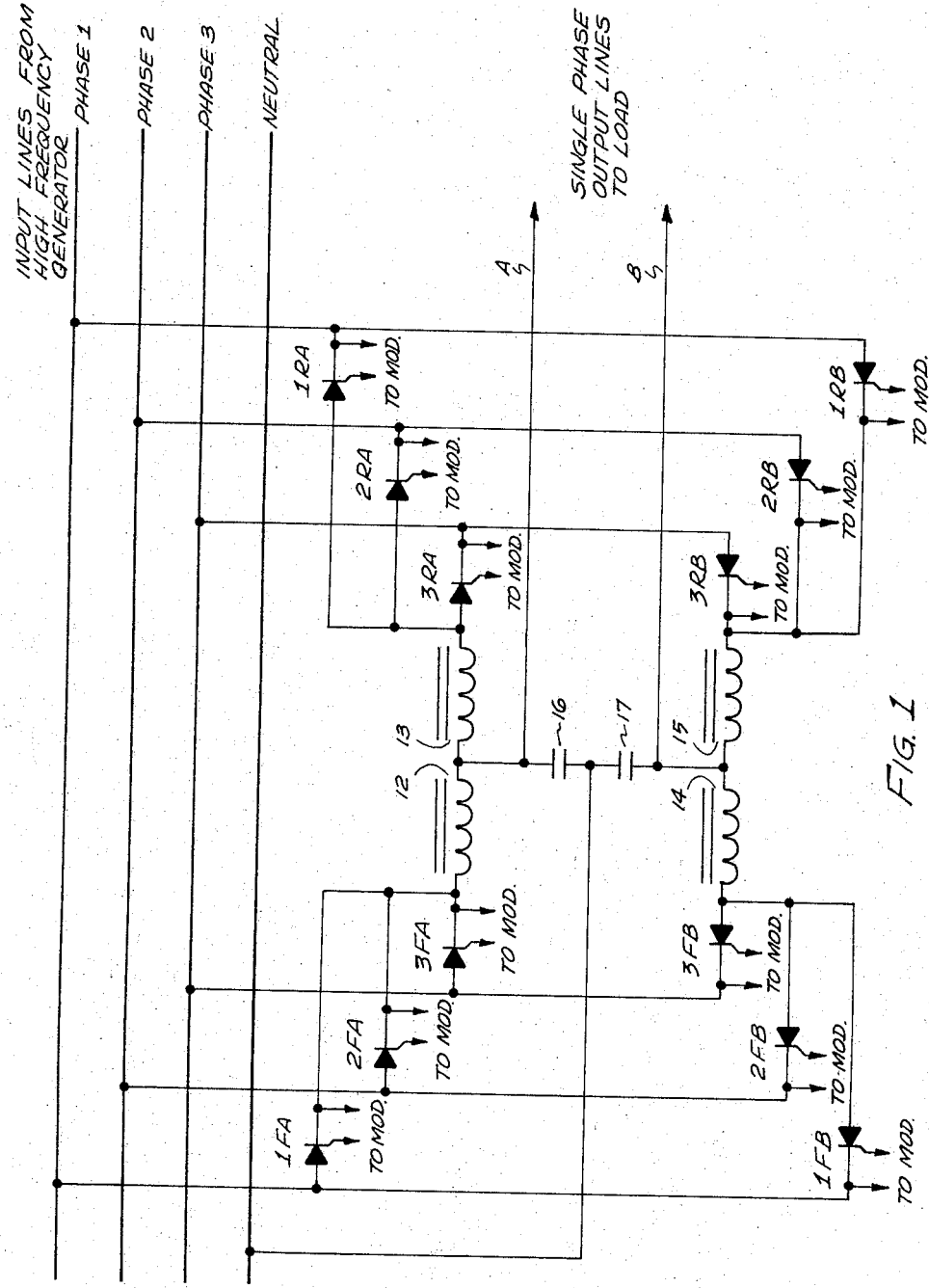

United States Patent Office 3,350,621
Patented Oct. 31, 1967

3,350,621
INDEPENDENTLY CONTROLLED RECTIFIER BRIDGE CONVERTER
Samuel C. Caldwell, Chagrin Falls, Ohio, assignor to General Electric Company, a corporation of New York
Filed Mar. 25, 1964, Ser. No. 354,588
5 Claims. (Cl. 321—7)

The invention relates to a frequency converter, and particularly to a frequency converter which converts a relatively high frequency alternating current to a relatively low frequency alternating current by means of controlled switching devices.

More particularly, the invention relates to variable speed, constant frequency (VSCF) systems. A VSCF system is particularly useful in electrical power generating systems in which the prime mover, such as an airplane engine or a portable diesel engine, runs at various speeds for some reason. The prime mover drives a relatively high frequency alternating current (AC) generator, and the relatively high frequency alternating current produced by the generator is converted to relatively low frequency alternating current by means of unidirectional switching devices. These switching devices are rendered conductive at the proper times so that the current they permit to flow has the desired frequency and wave shape. The alternating current generator driven by the prime mover may have a nominal output frequency in the order of 2,000 to 4,000 cycles per second, and the relatively low frequency produced by the VSCF system may be 60 or 400 cycles per second. However, these frequencies are examples only. The relatively low frequency current produced by the switching devices may be provided between a line and a neutral, or may be provided between two output lines. If line-to-neutral current is provided, the switching devices can be independently rendered conductive. But if line-to-line current is provided, the switching devices used in prior art systems cannot be rendered conductive independently of each other. In prior art systems, at the beginning of each half cycle of low frequency current, a pair of switching devices had to be rendered conductive at the same time to initiate current flow in the half cycles. After this paired conduction, the desired conduction could be effected to provide the desired low frequency alternating current. This previous requisite of paired or simultaneous conduction has made it difficult to design circuits to render the switching devices conductive.

Accordingly, an object of the invention is to provide a VSCF system which provides line-to-line current and which permits the switching devices to be rendered conductive independently of each other.

Another object of the invention is to provide an AC to AC frequency converter which provides line-to-line current and which does not require the switching devices to be turned on simultaneously.

Another object of the invention is to provide an improved VSCF system.

Another object of the invention is to provide an improved AC to AC frequency converter.

While various switching devices may be used in VSCF systems, silicon controlled rectifiers have been widely used. These controlled rectifiers require appropriate gate current to cause them to begin to conduct, but once they do begin to conduct, they continue to do so with the proper anode-cathode voltage. If this anode-cathode voltage depends upon conduction of another controlled rectifier, as it would in a line-to-line system, it may be necessary to supply the gate current for a relatively long time. This long gate current may be difficult or impossible to provide.

Accordingly, another object of the invention is to provide a VSCF system or AC to AC frequency converter which uses controlled rectifiers in a line-to-line arrangement and which requires only a normal duration of gate current to render the controlled rectifiers independently and respectively conductive.

Briefly, the above and other objects of the invention are achieved by the use of a reactance, preferably a capacitor, coupled between each low frequency line and a neutral which need to be coupled only to the high frequency source or generator. These reactances provide a current path for the switching devices so that when a switching device is rendered conductive, current may flow through that switching device independently of the conductive state of the other switching devices. These reactances may also provide the additional advantage of filtering in some cases.

Figure 2:
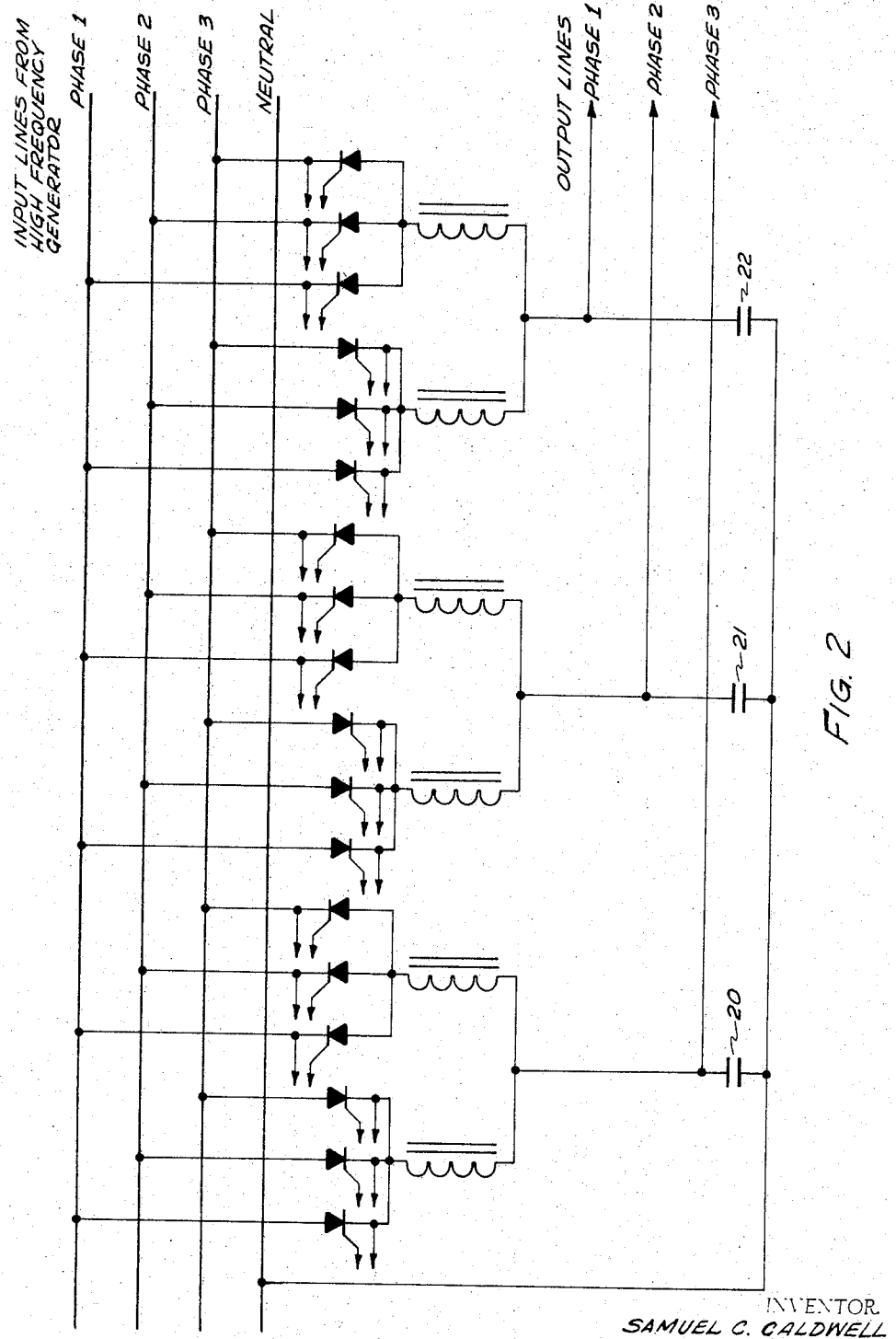

The invention is particularly pointed out in the claims. The invention may be better understood from the following description given in connection with the accompanying drawing, in which:

FIGURE 1 shows a schematic diagram of part of an AC to AC frequency converter or VSCF system in accordance with the invention for converting a relatively high frequency, three phase source to a relatively low frequency, single phase output; and FIGURE 2 shows a schematic diagram of part of an AC to AC frequency converter or VSCF system in accordance with the invention for converting a relatively high frequency, three phase source to a relatively low frequency, three phase output.

In FIGURE 1, the input lines comprise three phases and a neutral which are coupled to some source of relatively high frequency alternating current, such as a generator driven by a prime mover. The generator and prime mover are not shown. Since the three phase input frequency may vary because of the variable speed of the prime mover, it is desirable to convert this to a substantially constant and relatively low frequency. This is the purpose of an AC to AC frequency converter or a variable speed, constant frequency system (VSCF). Such systems are known in the art, and generally convert a relatively high but variable frequency of alternating current to a relatively low but constant frequency of alternating current. In FIGURE 1, the three phase, relatively high frequency alternating current is converted to a single phase, relatively low frequency alternating current which appears on output lines A and B. These lines are connected to a load (not shown). This conversion is provided by means of four groups of three silicon controlled rectifiers. The control rectifiers are indicated by a number and two letters. The numbers 1, 2, and 3 indicate the associated input line phase, the letters F and R indicate forward and reverse current directions, and the letters A and B indicate the associated output line. The control rectifiers permit anode-cathode current to flow in the conventional direction indicated by the arrow when appropriate gate current is supplied to the gate electrode and cathode of the control rectifiers. The rectifiers are coupled to provide anode-cathode current in each direction (arbitrarily designated forward and reverse) between each phase of the input line and each of the output lines. In addition, inductances 12, 13, 14, 15 are coupled between each group of rectifiers and the output lines A and B. These inductances filter some harmonic and ripple frequencies and also limit the magnitude of current which may flow directly between control rectifiers in groups coupled to the same output line. Thus, phase 1 of the input lines is coupled in both directions to the upper output line A through the control rectifiers 1FA and 1RA, and is coupled in both directions to the lower output line B through the control rectifiers 1FB and 1RB. Phase 2 of the input lines is coupled to the upper output line A in both directions through the control rectifiers 2FA and 2RA, and is coupled in both directions to the lower output line B through the control rectifiers 2FB and 2RB. Phase 3 of the input lines is coupled through the control rectifiers 3FA and 3RA, and is coupled in both directions to the lower output line B through the control rectifiers 3FB and 3RB.

The gate electrode and cathode of each control rectifier is indicated as being coupled to a modulator. As known in the art, this modulator provides gate current to each of the control rectifiers at appropriate times so that anode-cathode current may flow through the control rectifiers. These times vary with respect to the frequency and phase of the relatively high frequency input alternating current and with respect to the desired waveform of the relatively low frequency output alternating current. It is usually desirable that the output waveform approximate a sine wave, and this can be achieved with a proper design of the modulator. Generally, this design requires a carefully planned time, relative to the phases and frequency of the input alternating current, at which each control rectifier is rendered conducting or turned on. And further, these times will vary during each half cycle of the output alternating current. If the frequency of the three phase input has a nominal value of 4,000 cycles per second, and if the desired relatively low frequency is 400 cycles per second, it will be seen that ten cycles of input frequency may be utilized to produce one cycle of output frequency. Thus, five cycles of the input frequency may supply output current in one direction and five cycles of input frequency may supply current in the reverse direction. A typical conduction sequence of the control rectifiers for this condition is illustrated by the following table:

*Forward half cycle rectifier conduction sequence*

FA Rectifier: 1 1 2 2 3 3 1 1 2 2 3 3 1 1 2 2 3 3 1 1 2 2 3 3 1 1 2 2 3 3
FB Rectifier: 2 3 3 1 1 2 2 3 3 1 1 2 2 3 3 1 1 2 2 3 3 1 1 2 2 3 3 1 1 2

*Reverse half cycle rectifier conduction sequence*

RB Rectifier: 2 2 3 3 1 1 2 2 3 3 1 1 2 2 3 3 1 1 2 2 3 3 1 1 2 2 3 3 1 1
RA Rectifier: 3 1 1 2 2 3 3 1 1 2 2 3 3 1 1 2 2 3 3 1 1 2 2 3 3 1 1 2 2 3

In this table, the sequence of conduction is from left to right. Thus, at the beginning of a forward half cycle, rectifiers 1FA and 2FB conduct, then rectifiers 1FA and 3FB conduct, then rectifiers 2FA and 3FB conduct, and so on until the end of the forward half cycle. This sequence is followed by a reverse half cycle. At the beginning of a reverse half cycle, rectifiers 2RB and 3RA conduct, then rectifiers 2RB and 1RA conduct, then rectifiers 3RB and 1RA conduct, and so on until the end of the reverse half cycle. Then, the forward half cycle sequence is repeated. The time at which a different rectifier conducts is the time which is important as far as producing the desired output waveform is concerned. There are thirty conducting conditions in each low frequency half cycle in the table because the three phase input waves cross each other six different times in any given period of one cycle. It was assumed that there are five cycles in each low frequency half cycle.

The arrangement shown in FIGURE 1 is generally known as a line-to-line frequency converter or VSCF system. That is full line-to-line voltage (neglecting drops through the control rectifiers) can be obtained. At the time when each half cycle of the relatively low frequency makes a transition between forward and reverse currents, half of the control rectifiers have been turned off and the other half have been conducting in sequence. Before proper sequencing of the control rectifiers which were turned off can begin, current must be established through an A control rectifier and a B control rectifier. That is, when the forward half cycle sequence begins (see the table above), an FA and an FB rectifier have to conduct at the same time. Or, when the reverse half cycle sequence begins (see the table above), an RB and an RA rectifier have to conduct at the same time. If it were necessary to turn control rectifiers 1FA and 2FB or 2RB and 3RA (see the table above) on at the same time, then the modulating program would be made more difficult. This is because of the added simultaneous conduction condition to establish current followed by the varied time of turning on different rectifiers in a sequence. In order that this added simultaneous conduction condition can be eliminated, the invention provides a current path between each output line A and B and the input neutral. This current path is preferably reactive, and may include capacitors 16, 17 coupled between each of the single phase output lines A and B and the input neutral. These capacitors 16, 17 provide a circuit through which any one of the control rectifiers may conduct current to the neutral until such time as another of the control rectifiers begins to conduct. Thus, when the control rectifier 1FA is turned on, it may conduct current through the capacitor 16 to the neutral until another rectifier (rectifier 2FB in the forward sequence above) is turned on. It will thus be seen that the capacitors 16, 17 (or other appropriate circuit elements) eliminate the necessity for designing a circuit which causes initial simultaneous conduction of rectifiers, after which the rectifiers are caused to conduct in a desired time sequence.

FIGURE 2 shows another embodiment of the invention in which a CSCF system provides conversion from a three phase input to a three phase output. The similarity between the three phase circuit of FIGURE 2 and the single phase circuit of FIGURE 1 will be seen. A control rectifier is provided to permit current to flow in both directions between each input phase and each output phase. This is achieved by the 18 control rectifiers shown. In accordance with the invention, capacitors 20, 21, 22 are coupled between each of the output phases and the input neutral to provide the current path for any conducting control rectifier. As mentioned in connection with FIGURE 1, this eliminates the necessity for having two control rectifiers turned on at the beginning of each half cycle of the relatively low frequency output.

It will thus be seen that the invention provides an improved VSCF system which simplifies the programming of the current flow devices or control rectifiers when the rectifiers are used in a line-to-line arrangement. Persons skilled in the art will appreciate that modifications to these circuits may be made. For example, other impedance elements such as inductors may be used instead of capacitors if they present the proper impedance to the frequencies being used. Likewise, a series circuit comprising an inductor and a capacitor may be used in place of the capacitors. And finally, a filter circuit which presents a relatively high frequency impedance to the desired output frequency may be substituted for the capacitors. This filter may present relatively low impedances to undesired frequencies and eliminate these undesired frequencies. Therefore, while the invention has been described with reference to a single embodiment, it is to be understood that modifications may be made without departing from the spirit of the invention or from the scope of the claims.

What I claim as new and desire to secure by Letters Patent of the United States is:

1. In a circuit for converting an alternating current frequency supplied on input lines and a neutral into a different alternating frequency on output lines coupled to a load, said circuit having unidirectional current control devices coupled in both current-carrying directions between each of said input lines and each of said output lines and having means coupled to said current control devices for causing selected ones of said current control devices to conduct; the improvement comprising a reactive circuit for each output line coupled between each output line and said neutral for providing a current path for said current control devices when no conduction path through the load exists.

2. In a circuit for converting an alternating current frequency supplied from a source on input lines into a lower alternating current frequency on output lines coupled to a load, said source having a neutral line, and said circuit having a pair of unidirectional current control devices respectively coupled in opposite current-carrying directions between each of said input lines and each of said output lines and having means coupled to said current control devices for causing selected ones of said current control devices to conduct curent in a path from one input line to an output line, through the load, another current control device to another input line, the improvement comprising a circuit having a capacitor coupled between each of said output lines and said neutral for providing a current path for the conducting current control device in a path when the other current control device in the path is not conducting.

3. A system for converting a relatively high frequency alternating current supplied on input lines and a neutral to a relatively low frequency alternating current on output lines comprising a plurality of controllable devices that permit current flow in one direction therethrough in response to a control signal applied thereto, means coupling said controllable devices between each of said input lines and each of said output lines to provide a current path in both directions between each of said input lines and each of said output lines, means coupling a reactive device that presents a relatively high impedance to said relatively low frequency between each of said output lines and said neutral, each reactive device providing a path for current to flow to said neutral whenever the current path between said input lines and said output lines is not completed, and means coupled to said controllable devices for supplying control signals thereto in a predetermined sequence.

4. A system for converting a first frequency of multi-phase alternating current supplied on input lines from a source having a neutral to a second frequency of alternating current on output lines comprising a plurality of controlled rectifiers each having an anode, a cathode, and a control electrode, said controlled rectifiers permitting current to flow from said anode to said cathode in response to a control signal applied to said control electrode, means coupling said controlled rectifiers between said input lines and said output lines to provide anode to cathode current paths in opposite directions between each of said input lines and each of said output lines, means respectively coupling a reactive circuit between each of said output lines and said neutral, each reactive circuit providing an alternative path for current to flow whenever the controlled rectifier which completes the path from an output line to an input line is not conducting, and means coupled to said controllable rectifiers for supplying control signals thereto in a predetermined order.

5. A system for converting a first frequency of multi-phase alternating current supplied on input lines from a source having a neutral to a second frequency of multi-phase alternating current on output lines comprising a plurality of controlled rectifiers each having an anode, a cathode, and a control electrode, said controlled rectifiers permitting current to flow from said anode to said cathode in response to a control signal applied to said control electrode, means coupling said controlled rectifiers between said input lines and said output lines to provide respective anode to cathode current paths in opposite directions between each of said input lines and each of said output lines, means respectively coupling a reactive circuit comprising a series capacitor between each of said output lines and said neutral, each capacitor providing an alternate path for current to flow whenever the controlled rectifier which completes the path from an output line to an input line is not conducting, and means coupled to said controlled rectifiers for supplying control signals thereto in a predetermined order with respect to the phases of said first and second alternating currents.

References Cited
FOREIGN PATENTS 1,325,452  3/1963  France.
1,339,607  9/1963  France.
1,138,154  10/1962  Germany.

JOHN F. COUCH, *Primary Examiner.*
G. GOLDBERG, *Assistant Examiner.*